United States Patent [19]

Park

[11] Patent Number: 5,036,722

[45] Date of Patent: Aug. 6, 1991

[54] BACKWARD SHIFT CONTROL DEVICE OF A MANUAL TRANSMISSION GEAR FOR USE IN AUTOMOBILES

[75] Inventor: Sang C. Park, Kyongki, Rep. of Korea

[73] Assignee: Hyundai Motor Company, Seoul, Rep. of Korea

[21] Appl. No.: 430,266

[22] Filed: Nov. 2, 1989

[30] Foreign Application Priority Data

Nov. 2, 1988 [KR] Rep. of Korea .................. 88-14384

[51] Int. Cl.⁵ ...................... F16H 61/18; F16H 59/04
[52] U.S. Cl. .................................... 74/476; 74/473 R
[58] Field of Search ............................ 74/473 R, 476

[56] References Cited

U.S. PATENT DOCUMENTS

| | | | |
|---|---|---|---|
| 1,250,355 | 12/1917 | Robinson et al. | 74/476 |
| 3,805,635 | 4/1974 | Grosseau | 74/473 R |
| 4,275,614 | 6/1981 | Okubo et al. | 74/476 |
| 4,524,635 | 6/1985 | Hulin et al. | 74/473 R X |
| 4,633,728 | 1/1987 | May | 74/476 |

Primary Examiner—Allan D. Herrmann
Attorney, Agent, or Firm—Birch, Stewart, Kolasch & Birch

[57] ABSTRACT

A backward shift control device of a manual transmission gear for use in automobiles includes a fixing boss fixedly disposed in the vicinity of a backward shift control lever and equipped with a suspension pin, a stopper including a suspension part wherein the middle part is rotatably supported on the boss by an axial pin for rotating and controlling rotation of a backward shift control operation portion of a backward shift control lever, a stopper also being provided with a catching member caught by the suspension pin, and an elastic member elastically pressing the suspension part of the stopper to a backward shift control position at all times, whereby the device can prevent erroneous operation of the shift control and resultant damage to an automobile.

9 Claims, 3 Drawing Sheets

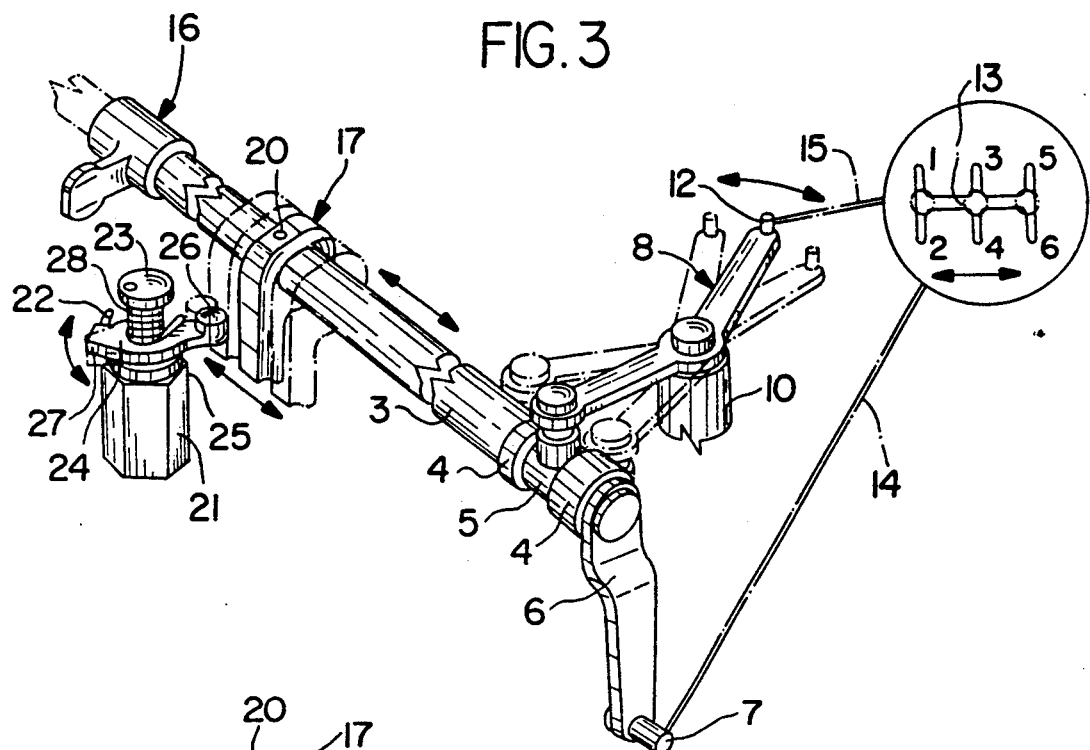
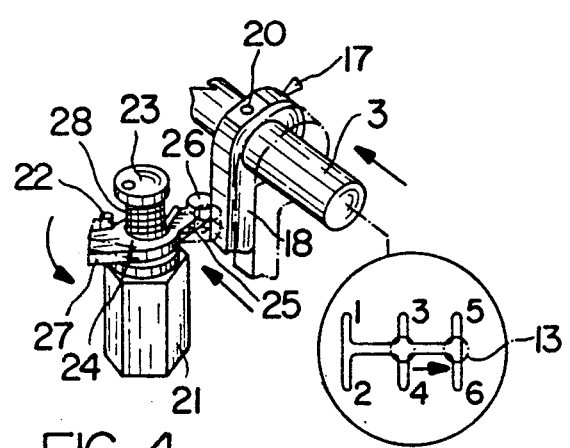
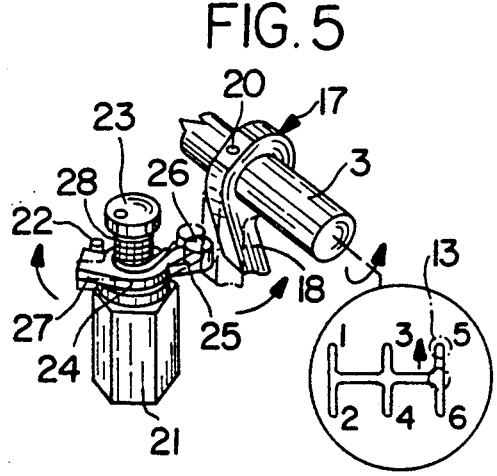
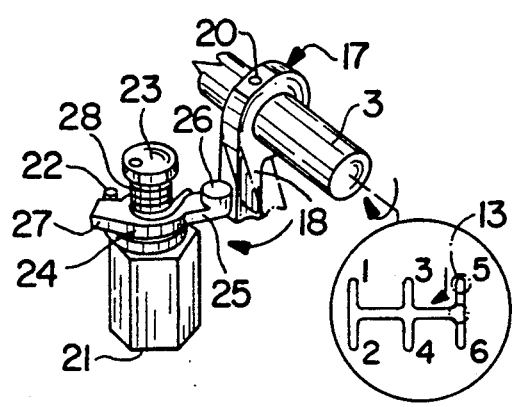

BACKWARD SHIFT CONTROL DEVICE OF A MANUAL TRANSMISSION GEAR FOR USE IN AUTOMOBILES

BACKGROUND OF THE INVENTION

1. Field of the Invention

The present invention relates to a backward shift control device of a manual transmission gear for use in automobiles and more particularly, to a backward shift control device of a 5-gear manual transmission gear for use in automobiles so as to prevent giving damage to the manual transmission gear by automatically checking a shift to reverse even if a driver mistakenly shifts into reverse driving range directly from manual fifth gear during operation.

2. Description of the Prior Art

Referring to a hand lever shift pattern of 5-gear manual transmission gear for use in conventional automobiles, manual fifth gear and reverse are on a straight line. Accordingly, the hand lever is apt to shift to reverse by a mistake made by the driver during operation in fifth gear. In such transmission gear, it not only causes the transmission gear to be damaged but also gives rise to an accident in which a car is overturned. Therefore, shifting directly to reverse during operation in manual fifth gear has to be controlled. However, the automobiles heretofore are not equipped with a contrivance for controlling a shift from the fifth gear directly to reverse. Even if the automobiles are equipped with control devices, such control devices are complicated in structure and in assembly because such control devices include a large number of parts. Accordingly, it is expensive to manufacture and inconvenient in use such control devices.

SUMMARY OF THE INVENTION

Accordingly, it is an object of the present invention to provide a backward shift control device of a manual transmission gear for use in a automobile so as not to cause damage to the transmission gear, and the automobile possibly being overturned, by enabling the transmission gear to shift to neutral position first and then to reverse without shifting directly to reverse when the transmission gear intends to shift to reverse from manual fifth gear.

Another object of the present invention is to provide a backward shift control device of a manual transmission gear which is simple in structure, inexpensive to manufacture, and convenient in use.

A further object of the present invention is to provide a backward shift control device of a manual transmission gear which includes a control shaft disposed in a transmission gear housing for axially moving and rotating, an outer select lever fixed on one end of the control shaft having its free end connected to a shift hand lever by a cable, an outer shift lever having one end interlocked with a guiding columnar groove formed on one end of the control shaft and the other end of the outer shift lever connected to the shift hand lever by a cable, and a select lever fixedly disposed on the other end of control shaft, a fixing boss fixedly disposed in the vicinity of a backward shift control lever and having a suspension pin, a suspension part having its middle part supported on the boss by an axial pin to be rotatable for controlling rotation about the side of backward shift of backward shift control operation part of the backward shift control lever, a stopper provided with a catching part which is caught by the suspension pin, and an elastic member which elastically presses the suspension part of the stopper to the backward shift control position at all times wherein the backward shift control lever is adapted to engage with the control shaft and a boss portion is integrated with the backward shift control operation portion by fixing with a spring pin. The suspension pin of the fixing boss is formed by integrating with the fixing boss or a separate suspension pin is combined with the fixing boss by a screw. The front end contact surface of the stopper of a stopper suspension member is formed by a plane surface on the front side thereof and circular surfaces on both sides thereof or by a plane surface on the front side and inclined surfaces on both sides thereof. The elastic member which elastically presses the backward shift control lever which uses a torsion spring wound onto the axial pin and having one arm thereof caught by the axial pin and the other arm thereof caught by the backward shift control operation portion or uses a tensile coil spring having one end thereof caught by the backward shift lever and the other end thereof caught by a spring peg fixed in the transmission gear housing.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood form the detailed description given hereinbelow and the accompanying drawings which are given by way of illustration only, and thus are not limitative of the present invention, and wherein:

FIG. 3 is a perspective view illustrating the select operating condition according to the present invention;

FIG. 4 is a perspective view of basic components illustrating the select operating condition from manual third gear, fourth gear, and neutral position to manual fifth gear, reverse, and neutral position according to the present invention;

FIG. 5 is a perspective view of basic components illustrating the shift operating condition from manual fifth gear, reverse, and neutral position to manual fifth gear according to the present invention;

FIG. 6 is a perspective view of the basic components illustrating the shift operating condition from manual fifth gear to reverse according to the present invention;

DESCRIPTION OF THE PREFERRED EMBODIMENTS

Figure 1:
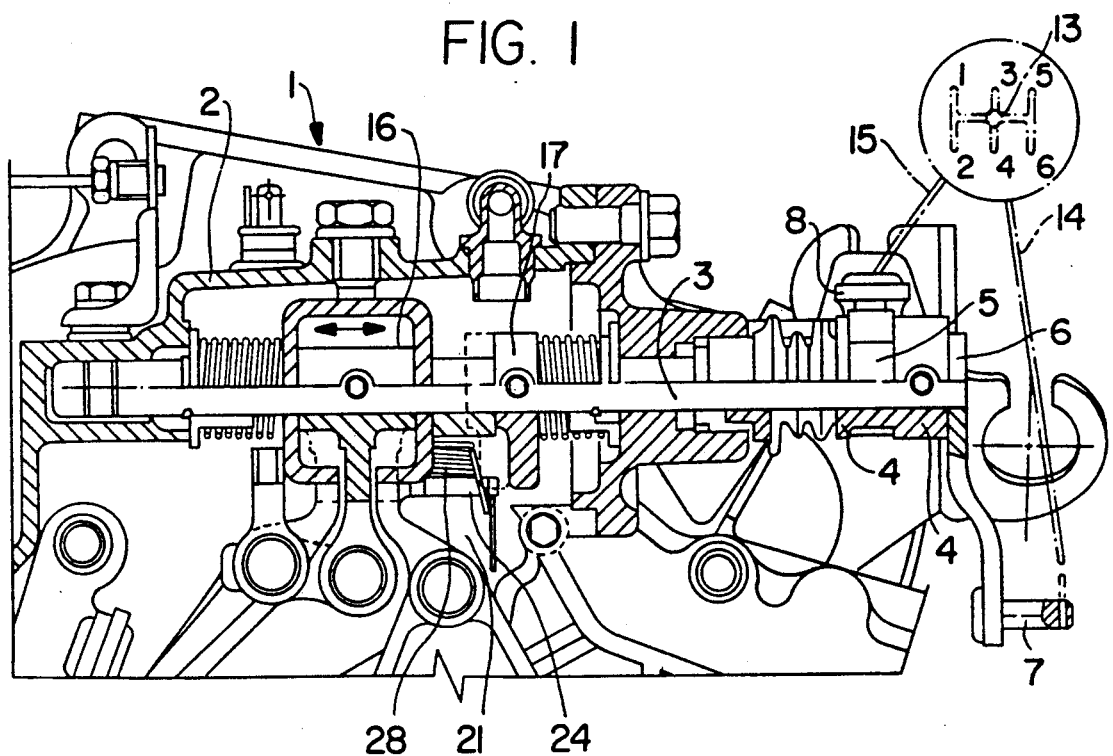
FIG. 1 is a front elevational view of a backward shaft control device of a manual transmission gear for use in automobiles of the present invention containing cut away portions in order to illustrate the construction of the device of the present invention.
Figure 2:
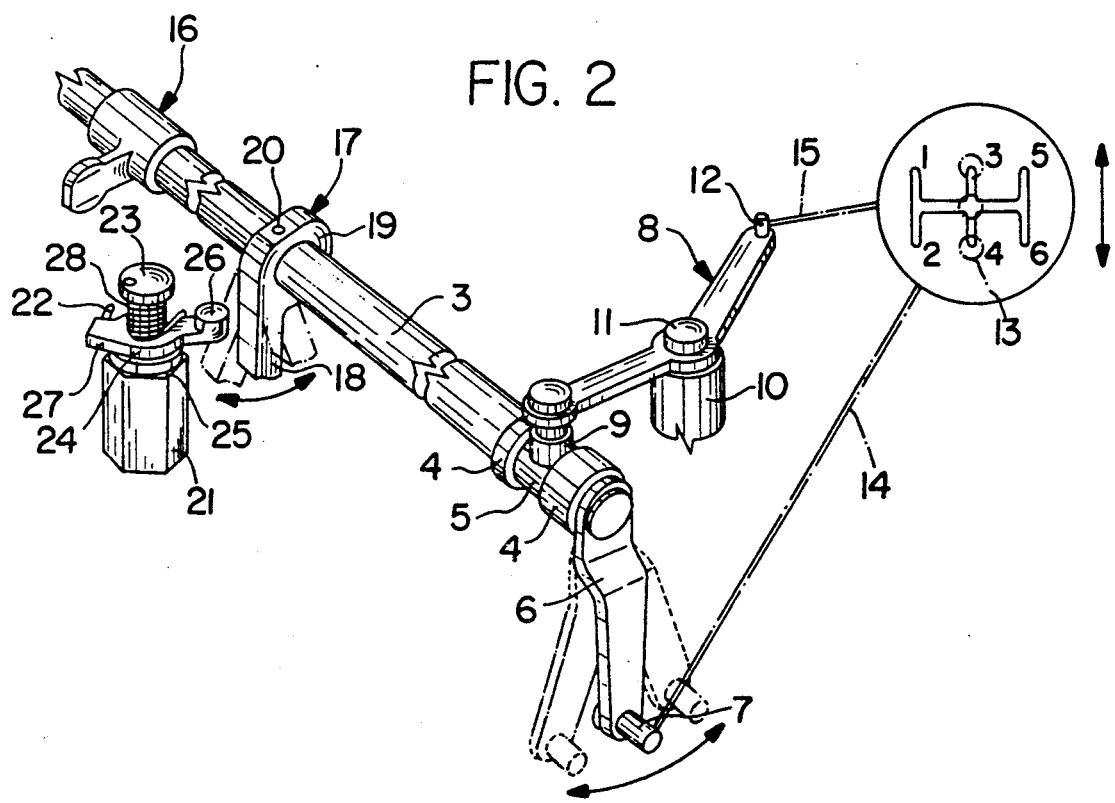
FIG. 2 is a perspective view illustrating the shift operating condition according to the present invention.

Referring now in detail to the drawings for the purpose of illustrating preferred embodiments of the present invention, the backward shift control device of a 5-gear manual transmission gear 1 for use in automobiles as shown in FIGS. 1, 2, and 3 comprises a control shaft 3 disposed in a transmission gear housing 2 so as to be axially movable and rotatable, an outer select lever 8 supported by a support 10 disposed on near end of the control shaft 3 having its free end connected to a shift hand lever 13 through a cable 15, and having one end 9 thereof interlocked with a guiding columnar groove 5 formed on one end of the control shaft 3 an outer shift lever 6 fixedly disposed on one end of the control shaft 3, through a cable 15, and a select lever 16 fixedly disposed on the other end of the control shaft 3.

The guiding columnar groove 5 formed on one end of the control shaft 3 is defined in a member having a pair of rings 4. The outer select lever 8 is rotatably supported on a supporting boss 10 by an axis 11 for rotating. The outer shift lever 6 and the outer select lever 8 include connecting pins 7 and 12 disposed on the free ends thereof for connecting to the cables 14 and 15, respectively.

As shown in FIGS. 2 to 7, a backward shift control lever 17 is fixedly disposed on the central portion of the control shaft 3 and a fixing boss 21 is fixedly disposed in a transmission gear housing 2 in the vicinity of the backward shift lever 17.

The backward shift control lever 17 includes a backward shift control operation portion 18 and a boss portion 19. The boss portion 19 is adapted to engage with the control shaft 3 by a spring pin 20. The backward shift control lever 17 can be fixed on the control shaft 3 by conventional securing means such as, for example, screw, bolt, welding, and the like.

Figure 8A:
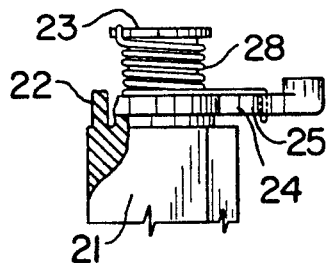
FIGS. 8(A) and 8(B) are front view of the present invention containing cut away portions illustrating a suspension pin formed separately and inserted into a fixing boss.
Figure 8B:
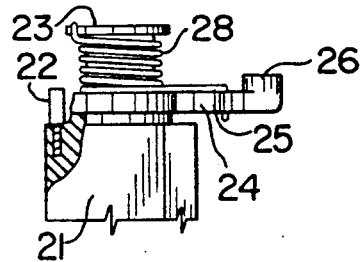

The fixing boss 21 is provided with an axial pin 23 supported thereon for rotating since the fixing boss 21 includes a stopper 24 having a stopper suspension member 25 disposed on the top thereof for controlling the backward shift control operation portion 18 of the backward shift control lever 17 through a front end contact member 26 of the stopper 24 which is provided with a catching portion 27 which is caught by a suspension pin or a screw 22. The suspension pin 22 is integrated with one side on the top of the fixing boss 21 as shown in FIG. 8(A) or is formed separately and combined spirally with one side on the top of the fixing boss 21 as shown in FIG. 8(B). The front end contact member 26 of the stopper suspension member 25 controls the rotation of the backward shift control lever 17 by contacting with the backward shift control operation portion 18 of the backward shift control lever 17.

Figure 9A:
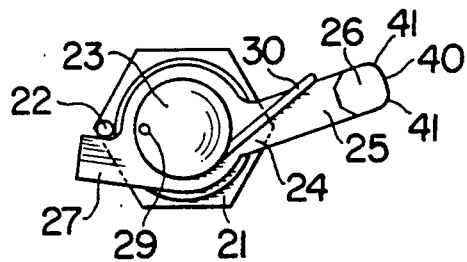
FIG. 9(A) is a top plan view of the front end contract surface of the stopper suspension part according to the present invention illustrating in the shape of a circular arc.
Figure 9B:
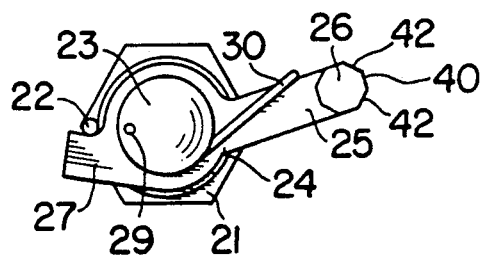
FIG. 9(B) a top plan view illustrating another embodiment of the front end contact surface of the stopper suspension part according to the present invention illustrating in shape of a gradient.
Figure 10A:
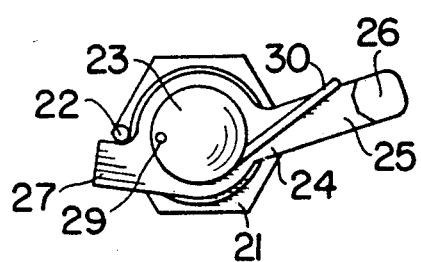
FIG. 10(A) is a top plan view of an elastic member having a torsion spring stopper according to the present invention.
Figure 10B:
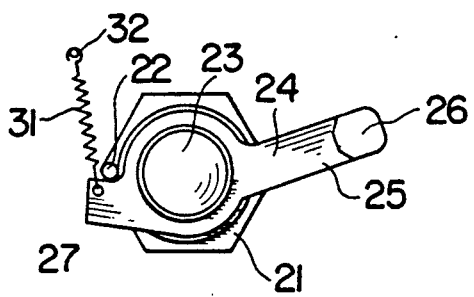
FIG. 10(B) is a top plan view illustrating another embodiment of the elastic member illustrating a tensile coil spring stopper.

As shown in FIGS. 4, 5, 6, and 7, the front end contact member 26 of the stopper 24 is formed with a plane surface 40 on the front side and circular surfaces 41 on both sides thereof (FIG. 9(A)) or a plane surface 40 on the front side and inclined surfaces 42 on both sides thereof (FIG. 9(B)). When the front end contact member 26 contacts with the backward shift control operation portion 18 of the backward shift control lever 17, the plane surface 40 on the front side suspends the rotation of backward shift control operation portion 18 and the circular surfaces 41 or the inclined surfaces 42 on both sides allows it to slidably rotate therethrough.

The suspension member 25 of the stopper 24 is installed so as to elastically return to the backward shift control position at all times by means of a torsion spring 28. The torsion spring 28 wound onto the axial pin 23 is provided with one arm 29 thereof caught by the axial pin 23 and with the other arm 30 thereof caught by the suspension member or a tensile coil spring 31 at one end thereof caught by the catching member 27 formed as part of the stopper 24 and at other end thereof caught by a spring peg 32 fixed in the transmission gear housing 2 (FIGS. 9(A) and 9(B)).

In the use of the torsion spring 28, two torsion springs 28 are wound onto the axial pin 23 so that one arm of each torsion spring is fixed in the axial pin 23 and the other arm thereof is caught on both sides of the suspension member 25.

The apparatus according to the present invention operates as follows:

As shown in FIGS. 2 and 3, shifting to manual first gear, second gear, third gear, and fourth gear is achieved when the cables 14 and 15 give the turn to the outer select lever 8 and the outer shift lever 6 according to the shift hand lever 13 in the same manner as working principle of a conventional transmission gear. In this case, shifting between manual first gear and second gear, and between manual third gear and fourth gear is achieved freely because the backward shift control operation portion 18 of backward shift control lever 17 and the suspension member 25 of stopper 24 are so located as not to interfere with each other.

However, in the case of shifting to manual fifth gear and reverse as shown in FIG. 3, the shift hand lever 13 is selected to manual fifth gear and reverse from manual third gear and fourth gear. Then, the outer select lever 8 turns around in the direction of clockwise by pull of the cable 15, moving the control shaft 3 to the left, and selects the select lever 16 to manual fifth gear, reverse, and neutral position.

At this time, the backward shift control lever 17 on the control shaft 3 moves to the left without exception and the backward shift control operation portion 18 moves by contacting with the suspension member 25 of the stopper 24 disposed on one side so as to rotate. Consequently, as shown in FIG. 4, the stopper 24 which stands still with the catching member 27 caught by the suspension pin 22 is pushed by the elastic means such as a torsion spring 28 or a tensile coil spring 31 in some degree.

Thus it shows the fifth gear condition, a backward condition and a neutral condition, and shifting to manual fifth gear or reverse becomes possible. In other words, when the shaft hand lever 13 is shifted to manual fifth gear in such condition, the cable 14 is pulled by the normal operation (FIG. 2) causing the outer shift lever 6 to turn around in the direction of counterclockwise, and the control shaft 3 turns around together with it, and the backward shift control lever 17 on the control shaft 3 moves around irrelevantly to the suspension member 25 of the stopper 24 to achieve shifting to fifth gear (FIG. 5).

At that time, the driver operates shifting directly to reverse by mistake under the condition that shifting to manual fifth gear is attained, the shift hand lever 13 moves from the condition of FIG. 5 to the condition of FIG. 6. Accordingly, the outer shift lever 6 turns around by means of the cable 14, giving the direction of clockwise turn to the control shaft 3 and backward shift control lever 17. At this time, the stopper 24 turned around counterclockwise in opposition to the elastic force of elastic means being pushed by the backward shift control operation part 18 of the backward shift control lever 17 when selected to manual fifth gear, reverse, and neutral position, turns around the direction of counterclockwise by the restoring force of the elastic means. The catching member 27 is restored under the condition that it is caught by the suspension pin 22 on the fixing boss 21. In such condition, the plane surface 40 on the front side of the front end contact member 26 of the stopper 24 on the suspension member 25 remains on the backward rotation line from manual fifth gear side of the backward shift control operation portion 18 of the backward shift control lever 17 and the backward shift control operation portion 18 of the backward shift control lever 17 is caught by the suspension member 25 of the stopper 24 (FIG. 6). Accordingly, the backward shift control lever 17 and the control shaft 3 are deterred from turning round.

In such condition, the backward shift control lever 17 slidably rotates a little on the circular surface 41 or on the inclined surface 42 of front end contact member 26 of the suspension member 25 by the pulling force of shift hand lever 13 and returns to the condition of being selected to manual fifth gear, reverse, and neutral position, namely, to the first neutral condition between manual fifth gear and reverse as shown in FIG. 4.

Figure 7:
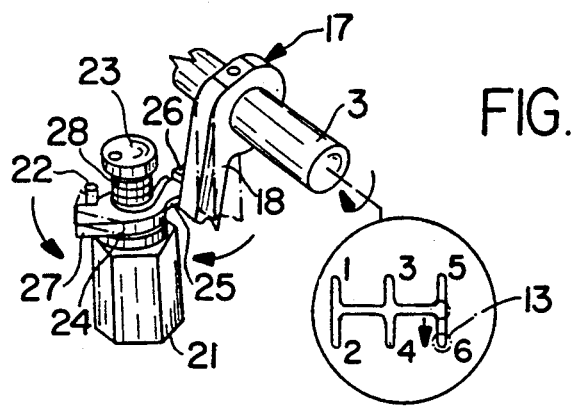
FIG. 7 is a perspective view of the basic components illustrating the shift operating condition from manual fifth gear, reverse, and neutral position to reverse according to the present invention.

When the shift hand lever 13 is shifted backward, the outer shift lever 6 is connected to the cable 14 turns around the direction of clockwise, and the backward shift control lever 17 is made rotatable (FIG. 7). Thus the control shaft 3 is shifted backward by turning round together with it.

Therefore, even when the driver shifts the transmission gear directly to reverse from manual fifth gear by mistake during operation in manual fifth gear, it is not shifted directly to reverse, if not through the neutral position. Thus the device of the present invention prevents not only damage to the transmission gear in automobiles but also an accident in which the automobile is overturned.

Also, the device of the present invention is simple in structure, inexpensive to manufacture, and convenient in use.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A backward shift control device for a manual transmission for use in automobiles which comprises:
    a control shaft disposed in a transmission gear housing for axial movement and rotation,
    an outer shift lever fixed on one end of said control shaft and having a free end thereof connected to a shift hand lever by a first cable,
    an outer select lever having one end thereof interlocked with a guiding columnar groove which is formed on one end of said control shaft and having a free end thereof connected to said shift hand lever by a second cable,
    a select lever fixedly disposed on the other end of said control shaft,
    a backward shift control lever fixed to a center portion of said control shaft,
    a fixing boss fixedly disposed in the vicinity of said backward shift control lever and provided with an axial pin and a suspension pin,
    stopper means including a suspension member rotatably supported on the said fixing boss, said suspension member having contact means positioned thereon for controlling rotation of a backward shift control operation portion of the backward shift control lever,
    said stopper means being provided with a catching member which is engageable with said suspension pin, and
    elastic means for elastically pressing the suspension member of the stopper means to a backward shift control position at all times, whereby the backward shift control device prevents erroneous operation of the shift control and resultant damage to an automobile.

2. The backward shift control device of claim 1, wherein the backward shift control lever is fixed to said control shaft in a boss portion thereof integrated with said backward shift control operation portion with a spring pin.

3. The backward shift control device of claim 1, wherein the backward shift control lever is fixed to said control shaft by a screw.

4. The backward shift control device of claim 1, wherein the suspension pin is integrated with the fixing boss.

5. The backward shift control device of claim 4, wherein the suspension pin is a screw.

6. The backward shift control device of claim 1, wherein said contact means is formed with a plane surface on a front side and circular surfaces on both sides thereof.

7. The backward shift control device of claim 1 wherein said contact means is formed with a plane surface on a front side and inclined surfaces on both sides thereof.

8. The backward shift control device of claim 1, wherein said elastic means is a torsion spring with one arm thereof caught by the axial pin and with the other arm thereof caught by said suspension member.

9. The backward shift control device of claim 1, wherein said elastic means is a tensile coil spring with one end thereof caught by a catching member of said stopper means and with the other end thereof caught by a spring peg fixed in a transmission housing.

* * * * *